US005567759A

United States Patent [19]
Taniguchi et al.

[11] Patent Number: 5,567,759
[45] Date of Patent: Oct. 22, 1996

[54] PROPYLENE POLYMER COMPOSITION

[75] Inventors: Hiroshi Taniguchi, Ichihara; Akihiko Yamamoto, Yamaguchi; Takao Nomura, Toyota; Takeyoshi Nishio, Okazaki; Hisayuki Iwai, Aichi, all of Japan

[73] Assignees: Mitsui Petrochemical Industries, Ltd., Tokyo; Toyota Jidosha Kabushiki Kaisha, Toyota, both of Japan

[21] Appl. No.: 427,623

[22] Filed: Apr. 21, 1995

Related U.S. Application Data

[63] Continuation of Ser. No. 101,741, Aug. 4, 1993, abandoned.

[30] Foreign Application Priority Data

Aug. 5, 1992 [JP] Japan ................... 4-209132

[51] Int. Cl.$^6$ .................................................. C08K 3/34
[52] U.S. Cl. ................................................. 524/451; 525/88
[58] Field of Search ............................. 524/437, 451, 524/505; 525/88, 89

[56] References Cited

U.S. PATENT DOCUMENTS

| 4,363,885 | 12/1982 | Fukui et al. | 523/212 |
|---|---|---|---|
| 4,439,573 | 3/1984 | Fukui et al. | 524/451 |
| 4,480,065 | 10/1984 | Kawai et al. | 524/418 |
| 4,748,206 | 5/1988 | Nogiwa et al. | 525/88 |
| 4,764,404 | 8/1988 | Genske et al. | 428/35 |

FOREIGN PATENT DOCUMENTS

| 0069479 | 1/1983 | European Pat. Off. . |
|---|---|---|
| 0132968 | 2/1985 | European Pat. Off. . |
| 0265075 | 4/1988 | European Pat. Off. . |
| 57-177038 | 10/1982 | Japan . |
| 58-17140 | 2/1983 | Japan . |
| 60-60154 | 4/1985 | Japan . |
| 256856 | 11/1987 | Japan . |
| 1-204946 | 8/1989 | Japan . |
| 3275753 | 12/1991 | Japan . |
| 2727553 | 12/1991 | Japan . |
| 4-153243 | 5/1992 | Japan . |
| 4-300935 | 10/1992 | Japan . |
| 5-59251 | 3/1993 | Japan . |
| 5-98093 | 4/1993 | Japan . |
| 5-98094 | 4/1993 | Japan . |
| 5-98097 | 4/1993 | Japan . |
| 5-98098 | 4/1993 | Japan . |
| 5-98129 | 4/1993 | Japan . |
| 5-98128 | 4/1993 | Japan . |
| 5-98121 | 4/1993 | Japan . |
| 2206886 | 1/1989 | United Kingdom . |
| 2246358 | 1/1992 | United Kingdom . |
| 8900876 | 2/1990 | WIPO . |

OTHER PUBLICATIONS

Tafmer A/P Catalogue of Ethylene/Allpha–Olefin Copolymers.

*Primary Examiner*—Paul R. Michl
*Assistant Examiner*—Umakant Rajguru
*Attorney, Agent, or Firm*—Sherman and Shalloway

[57] ABSTRACT

Propylene polymer compositions of the present invention comprising a specific propylene block copolymer, specific ethylene-propylene copolymer rubber, specific ethylene-propylene-diene copolymer rubber, specific ethylene-butene-1 copolymer rubber, and talc in specific proportions are provided. The propylene polymer compositions of the invention are capable of providing therefrom molded products excellent in balance between stiffness and impact resistance, and having high surface hardness with excellent scratch resistance.

13 Claims, No Drawings

PROPYLENE POLYMER COMPOSITION

This application is a continuation of application Ser. No. 08/101,741, filed Aug. 4, 1993, abandoned.

FIELD OF THE INVENTION

This invention relates to propylene polymer compositions and more particularly to the propylene polymer compositions which are improved in surface hardness, imparted particularly with scratch resistance and capable of forming molded products useful in producing automotive bumpers or the like.

BACKGROUND OF THE INVENTION

Propylene polymers are excellent in strength, heat resistance, molding workability, chemical resistance, and also in economical efficiency, and have wide applications in household appliance parts, automotive parts and building components.

The propylene polymers mentioned above are required to have a further improved impact strength at low temperature in the fields of household appliance parts and automotive parts. For example, the impact resistance is imparted to the propylene polymers by incorporation of an ethylene propylene copolymer rubber into said propylene polymers.

Though the impact strength at low temperature can be imparted sufficiently to the propylene polymers by incorporating thereinto large amounts of the ethylene propylene copolymer rubber, the thus incorporated propylene polymers tend to decrease in stiffness properties and surface hardness. In order to prevent such a decrease in balance of physical properties as mentioned above, various attempts have been made, such as varying the composition of the ethylene, propylene copolymer rubber to be incorporated into the propylene polymers, or adding fillers thereto. For example, Japanese Patent Laid-Open Publn. No. 256856/1987 discloses propylene polymer compositions comprising a block copolymer consisting of propylene and ethylene, an ethylene/α-olefin random copolymer rubber, and talc or calcium carbonate, which are alleged to be excellent in impact resistance (impact strength at low temperature), stiffness properties and coating properties.

Further, Japanese Patent Laid-Open Publn. No. 42852/1990 discloses polypropylene resin compositions comprising an ethylene/propylene block copolymer, an ethylene/propylene copolymer rubber, and an ethylene/propylene/diene terpolymer rubber and talc, which are said to be excellent in stiffness properties and impact resistance.

Furthermore, Japanese Patent Laid-Open Publn. No. 33814/1991 discloses polypropylene resin compositions comprising an ethylene/propylene block copolymer, an ethylene/propylene copolymer rubber, an ethylene/propylene/diene terpolymer rubber and an inorganic filler such as talc, which are alleged to be excellent in stiffness properties, impact resistance and molding fluidity.

By the way, though molded products formed from such propylene polymer composition as mentioned above, for example, automotive bumpers are excellent in impact resistance, they are low in surface hardness. Accordingly, there is sometimes such a case wherein the bumper surface is marred at the time of molding or transporting thereof, and the bumper results in a rejected product. Accordingly, propylene polymer compositions capable of providing molded products having a further high surface hardness, that is, the molded products excellent in scratch resistance, are required.

The present inventors conducted extensive researches into propylene polymer compositions capable of forming molded products excellent in impact resistance as well as in scratch resistance without the sacrifice of excellent characteristics of propylene polymer, and eventually have found that propylene polymer compositions comprising a specific propylene block copolymer, and a specific ethylene-propylene copolymer rubber, a specific ethylene-propylene-diene copolymer rubber, a specific ethylene-butene-1 copolymer rubber and talc in specific proportions are capable of forming molded products having excellent impact strength at low temperature as well as in scratch resistance without the sacrifice of excellent characteristics inherent in propylene polymer, leading to accomplishment of the present invention.

OBJECT OF THE INVENTION

An object of the present invention is to provide propylene polymer compositions capable of giving excellent resistance and excellent scratch resistance to molded products formed therefrom without the sacrifice of excellent characteristics inherent in propylene polymer.

SUMMARY OF THE INVENTION

The propylene polymer compositions of the present invention are characterized by comprising

[A] 55–77% by weight of a propylene block copolymer rubber based on 100% by weight of the propylene polymer composition,

[B] 5–15% by weight of an ethylene-propylene copolymer rubber based on 100% by weight of the propylene polymer composition,

[C] 5–15% by weight of an ethylene-propylene-diene copolymer rubber based on 100% by weight of the propylene polymer composition,

[D] 8–20% by weight of an ethylene-butene-1 copolymer rubber based on 100% by weight of the propylene polymer composition, and

[E] 5–15% by weight of talc based on 100% by weight of the propylene polymer composition, wherein

[A] the propylene block copolymer is one containing the structural unit derived from ethylene in an amount of 2–15 mol %, and having 5–15 mol % of the copolymer soluble in n-decane at a temperature of 15°–20° C. and a melt flow rate of 15–60 g/10 min,

[B] the ethylene-propylene copolymer rubber is one containing the structural unit derived from ethylene in an amount of 70–90 mol %, and having a melt flow rate of 0.1–2.0 g/10 min,

[C] the ethylene-propylene-diene copolymer rubber is one containing the structural unit derived from ethylene in an amount of 70–90 mol %, the structural unit derived from diene in an amount of 8–13 mol %, and having a melt flow rate of 0.1–0.4 g/10 min, and

[D] the ethylene-butene-1 copolymer rubber is one containing the structural unit derived from ethylene in an amount of 85–95% mol %, and having a melt flow rate of 1.0–10.0 g/10 min.

The propylene polymer compositions of the invention are capable of forming molded products excellent in impact resistance as well as high in surface hardness and also excellent in scratch resistance without sacrifice of excellent }

DETAILED DESCRIPTION OF THE INVENTION

The propylene polymer compositions according to the present invention are illustrated below in detail.

The propylene polymer compositions of the invention are composed of the propylene block copolymer [A], ethylene/propylene copolymer rubber [B], ethylene/propylene/diene copolymer rubber [C], ethylene/butene-1 copolymer [D] and talc [E].

Propylene block copolymer [A]

The propylene block copolymer [A] used in the invention contains the structural unit derived from ethylene in an amount of 2–15 mol %, preferably 4–10 mol % and a soluble portion in n-decane at a temperature of 15°–25° C. in an amount of 5–15% by weight, preferably 7–10% by weight. This n-decane soluble portion at a temperature of 15°–25° C. has an intrinsic viscosity [η] is 4.5–9 dl/g, preferably 5.5–7.5 dl/g.

In this connection, the intrinsic viscosity is measured at 135° C. in a decaline solution containing the decane soluble portion at a concentration of 0.08–0.1 g/100 ml at a temperature of 15°–25° C.

Further, the ethylene content in this n-decane soluble portion at a temperature of 15°–25° C. is 35–45 mol %, preferably 38–42 mol %.

When the propylene block copolymer having the content of the structural unit derived from ethylene and that of the n-decane soluble portion at a temperature of 15°–25° C., both of which fall respectively within the above-mentioned ranges, is used in its composition, a propylene polymer composition capable of providing molded products excellent in impact resistance as well as in stiffness properties can be obtained.

In this connection, the content of the structural unit derived from ethylene as mentioned above is measured by means of the infrared spectrometry, and the soluble portion in n-decane at a temperature of 15°–25° C. is determined by a reverse calculation from a solid weight as measured by immersing 2 g of the specimen in 500 g of boiling n-decane for 5 hours, cooling the resulting solution to room temperature, filtering the separated solid phase by means of G4 type glass filter, followed by drying.

The propylene block copolymer [A] used in the invention has a melt flow rate (MFR: measured at 230° C. under a load of 2.16 kg) of 15–60 g/10 min, preferably 30–50 g/10 min. When the propylene block copolymer having a melt flow rate falling within the ranges defined above is used in its composition, a propylene copolymer composition excellent in moldability can be obtained.

Such propylene block copolymer [A] as mentioned above may be prepared by the use of a catalyst which can produce a stereospecific polypropylene. For example, the propylene block copolymer [A] can be obtained, for example, by two-stage polymerization of propylene and ethylene in the presence of a halogen containing titanium compound catalyst component or a catalyst composed of a transition metal compound catalyst component carried on a carrier and an organoaluminum compound catalyst component. Concretely, propylene is first allowed to undergo homopolymerization, and successively the propylene and ethylene are copolymerized to prepare the propylene block copolymer. The catalyst as mentioned above, if necessary, contain further an electron donor, or may be activated by such a procedure as co-pulverization or the like. The process for the preparation of propylene block copolymer is described in detail, for example in Japanese Patent Laid-open Publn. No. 98045/1977 or Japanese Patent Publn. No. 26613/1982.

The propylene block copolymer [A] used in the invention may be a propylene block copolymer in entirety, or may be a mixture of a propylene block copolymer and other polypropylene, so long as the content of structural unit derived from ethylene, soluble portion in n-decane at a temperature of 15°–25° C. and melt flow rate of said copolymer fall with the above-mentioned ranges, respectively.

Further, the propylene block copolymer [A] used in the invention may contain the structural unit derived from other polymerizable monomer.

The polymerizable monomer as mentioned above may include α-olefin such as butene-1, hexene-1, octene-1, 4-methyl-1-pentene or the like, vinyl ester such as vinyl acetate, unsaturated organic acid such as maleic anhydride or derivatives thereof.

The propylene block copolymer [A] may be a terpolymer of ethylene, propylene and other polymerizable monomer, or may be a mixture of said terpolymer and a propylene block copolymer containing no other polymerizable monomer.

The propylene polymer compositions of the invention contain the above-mentioned propylene block copolymer [A] in the proportion of 55–77% by weight, preferably 57–70% by weight based on 100% by weight of the propylene polymer composition.

By the use of the above-mentioned propylene block copolymers [A] as the propylene polymers in the invention, it becomes possible to obtain the propylene polymer compositions excellent in moldability and capable of forming molded products excellent in balance between mechanical strength such as impact resistance and stiffness properties as well as in heat resistance and dimensional stability in process.

Ethylene-propylene copolymer rubber [B]

The ethylene-propylene copolymer rubber [B] used in the invention contains the structural unit derived from ethylene in the proportion of 70–90 mol %, preferably 75–85 mol %. When the ethylene-propylene copolymer rubber having the content of the structural unit derived from ethylene as defined above is used in its composition, a propylene polymer composition capable of providing molded products excellent in physical property balance and scratch resistance as well as in low temperature impact strength can be obtained.

In this connection, the content of the structural unit derived from ethylene as mentioned above is measured by the infrared spectrometry.

Further, the ethylene-propylene copolymer rubber [B] used in the invention has a melt flow rate (MFR: measured at 230° C. and under a load of 2.16 kg), as measured in accordance with ASTM D-1238, of 0.1–2.0 g/10 min, preferably 0.1–10 g/10 min.

This ethylene-propylene copolymer rubber [B] may be used in any form of pellet, clam and bale if nothing interferes with the kneading operation at the time of forming the propylene polymer composition.

The propylene polymer composition of the invention contains 5–15% by weight, preferably 7–12% by weight of the ethylene propylene copolymer rubber [B] based on 100% by weight of the propylene polymer composition.

Ethylene-propylene-diene copolymer rubber [C]

The ethylene-propylene-diene copolymer rubber [C] used in the invention contains the structural unit derived from ethylene in an amount of 70–90 mol %, preferably 75–85 mol %, and also the structural unit derived from diene in an amount of 8–13 mol %, preferably 9–11 mol %.

In this connection, the contents of the structural units derived from ethylene and diene, respectively, are measured by the infrared spectrometry.

Further, the ethylene-propylene-diene copolymer rubber [C] used in the invention has a melt flow rate (MFR: measured at 230° C. under a load of 2.16 kg), as measured in accordance with ASTM D-1238, of 0.1–0.4 g/10 min, preferably 0.1–0.3 g/10 min.

Used preferably as the diene component in this ethylene-propylene-diene copolymer rubber [C] is concretely 5-ethylidene-2-norbornene.

The propylene polymer composition of the invention contains 5–15% by weight, preferably 5–10% by weight of the ethylene-propylene-diene copolymer rubber [C] based on 100% by weight of the propylene polymer composition.

Ethylene-butene-1 copolymer rubber [D]

The ethylene-butene-1 copolymer rubber [D] used in the invention contains 85–95 mol %, preferably 88–92 mol % of the structural unit derived from ethylene.

In this connection, the content of the structural unit derived from ethylene as mentioned above is measured by the infrared spectrometry.

This ethylene-butene-1 copolymer rubber [D] has a melt flow rate (MFR: measured at 230° C. under a load of 2.16 kg), as measured in accordance with ASTM D-1238, of 1.0–10.0 g/10 min, preferably 1.0–8.0 g/10 min.

Further, this ethylene-butene-1 copolymer rubber [D] may contain the structural unit derived from the polymerizable monomers mentioned below if nothing interferes with the object of the invention.

Such polymerizable monomer as mentioned above includes concretely such α-olefin as pentene-1, hexene-1 or 4-methyl-1-pentene.

The propylene polymer composition of the invention contains the above-mentioned ethylene-butene-1 copolymer rubber [D] in an amount of 8–20% by weight, preferably 10–17% by weight based on 100% by weight of the propylene polymer composition.

Talc [E]

The talc [E] used in the invention desirably has an average particle diameter of usually 0.2–10 μm, preferably 0.2–5.0 μm. In this connection, the average particle diameter of talc is measured by the liquid phase sedimentation method.

Used preferably in the invention as the talc mentioned above are those having an average value of aspect ratio (ratio of length or width to thickness) which exceeds 3 particularly exceeds 4.

The talc [E] used in the invention may be a surface untreated talc or a surface treated talc. Concrete examples of such surface treatment may include chemical treatment using such treatment agent as silane coupling agent, higher fatty acid, fatty acid metal salt, unsaturated organic acid, organic titanate, resin acid or polyethylene glycol, or physical treatment. When the talc subjected to such surface treatment as above is used in the composition, a propylene polymer composition capable of providing molded products excellent in weld strength, coatability and molding workability can be obtained.

The propylene polymer composition of the invention contains the above-mentioned talc [E] in an amount of 5–15% by weight based on 100% by weight of the propylene polymer composition, preferably 7–12% by weight based on 100% by weight of the propylene polymer composition.

By the use of such talc as mentioned above, it becomes possible to obtain a propylene polymer composition capable of providing molded products excellent in balance between stiffness and low temperature impact strength as well as excellent in coatability, dimensional stability and appearance.

Preparation of propylene polymer composition

The propylene polymer composition of the invention may be prepared, according to the kneading method commonly used in kneading compositions, by kneading the above-mentioned propylene block copolymer [A], ethylene-propylene copolymer rubber [B], ethylene-propylene-diene copolymer rubber [C], ethylene-butene-1 copolymer rubber [D] and talc [E].

The above-mentioned kneading method may be carried out, for example, by using such kneading device as single screw extruder, twin screw extruder, double screw kneader, Banbury mixer, or roll.

The propylene polymer composition of the invention is used usually in the form of pellets which are obtained by kneading together the above-mentioned components, followed by molding the kneaded product into pellets.

In preparing this propylene polymer composition, the components may be fed in any order to the kneading device, either simultaneously or separately.

Further, the propylene polymer composition of the invention may also be prepared by blend compounding or molding a previously obtained masterbatch while diluting it with the propylene block copolymer [A], said masterbatch containing the aforesaid rubber components (ethylene-propylene copolymer rubber [B], ethylene-propylene-diene copolymer rubber [C] and ethylene-butene-1 copolymer rubber [D]) and talc [E] in high concentrations.

The above-mentioned components are well kneadable together, and easily kneaded to form a composition.

The propylene polymer composition of the invention possesses excellent surface hardness without sacrifice of stiffness and low temperature impact strength of molded products formed from prior art propylene polymers or compositions comprising polypropylene and ethylene-propylene copolymer rubber, and particularly is capable of providing molded products excellent in scratch resistance which had not been obtained from the prior art propylene polymer or rubber compounded propylene polymer compositions.

As stated above, the propylene polymer composition of the invention is formed by compounding the specific propylene block copolymer [A], specific ethylene-propylene copolymer rubber [B], specific ethylene-propylene-diene copolymer rubber [C], specific ethylene-butene-1 copolymer rubber [D] and talc [E] in specific proportions.

Physical properties of the propylene polymer composition of the invention and preferred values thereof are as follows:

(1) the melt flow rate (ASTM D-1238, 230° C., load 2.16 kg) is 12–25 g/10 min, preferably 15–20 g/10 min, (2) the flexural modulus (ASTM D-790) is 10,000 kg/cm$^2$ or more, preferably 11,000 kg/cm$^2$ or more.

(3) Izod impact strength (notched) at −30° C. is 5 kg. cm/cm or more, preferably 6 kg.cm/cm or more, (4) Rockwell hardness (ASTM D-648) is 55 or more, preferably 60 or more, (5) the heat distortion temperature (ASTM D-648) is 100° C. or higher, preferably 105° C. or higher.

(6) the low-temperature brittle point (ASTM D-746) is −30° C. or lower, preferably −35° C. or lower.

Of the three kinds of rubber components contained in the propylene polymer composition of the invention, the ethylene-propylene copolymer rubber [B] and ethylene-propylene-diene copolymer rubber [C] are considerably small in melt flow rate normally, while the ethylene-butene-1 copolymer rubber is comparatively large in melt flow rate as rubber, as mentioned before. Further, the ethylene-butene-1 copolymer rubber [D] used in the invention is high in crystallinity index in comparison with an ordinary rubber. By containing such a combination of specific three kinds of rubbers as mentioned above, the propylene polymer composition of the invention provides a molded product having an increased surface hardness, thereby imparting excellent scratch resistance.

In addition to the components mentioned above, the propylene polymer composition of the invention may further contain other components so long as they do not mar the object of the invention.

The other components referred to above may include a thermoplastic resin or a thermosetting resin. Concrete examples of these resins are homopolymers of α-olefins such as polyethylene, polybutene-1 or the like, or copolymers of these α-olefin, copolymers of α-olefin and vinyl monomer, modified olefin polymers such as maleic anhydride-modified polypropylene or the like, nylon, polycarbonate, ABS, polystyrene, polyvinyl chloride, polyphenylene oxide, petroleum resin and phenolic resin.

Further, the propylene polymer composition of the invention may be incorporated with rubbers and latexes as mentioned below.

Such rubbers and latexes as referred to above include concretely polybutadiene, polyisobutylene, 1,2-polybutadiene acrylonitril-butadiene rubber, polyisobutylene, styrene-butadiene rubber, styrene-butadiene-styrene block copolymer, styrene-isobutylene-stryrene block copolymer; hydrogenation product of styrene-butadiene-stryrene block copolymer, and hydrogenation product of styrene-isobutylene-styrene block copolymer.

Still further, the propylene polymer composition of the invention may also be incorporated with various additives. Such additives may include concretely phenolic, sulfuric or phosphoric antioxidants, slip agents, antistatic agents, dispersing agents, copper damage inhibitors, neutralizing agents, foaming agents, plasticizers, foam inhibitors, flame retardants, crosslinkers, modifiers for flow characteristics of peroxides or the like, ultraviolet absorbers, light stabilizers, weld strength modifiers and nucleating agents.

By compounding the above-mentioned additives with the propylene polymer composition of the invention, the molded products obtained therefrom can be further improved in physical property balance, durability, coatability, printability, scratch resistance and molding workability.

EFFECT OF THE INVENTION

The propylene polymer composition of the invention is prepared by compounding the specific propylene block copolymer [A] with the specific ethylene-propylene copolymer rubber [B], specific ethylene-propylene-diene copolymer rubber [C], and specific ethylene-butene-1 copolymer rubber [D] in specific proportions, and hence the composition is capable of providing molded products excellent in balance between stiffness and impact resistance (low temperature impact strength), and also having a high surface hardness and excellent in scratch resistance.

The molded products formed from the propylene polymer composition of the invention are excellent not only in impact resistance but also in scratch resistance in comparison with molded products of the prior art propylene polymer compositions, and particularly useful in the manufacture of automotive bumper or the like. The automotive bumper formed from the propylene polymer composition of the invention is hard to be scratched at the time of the molding and transportation thereof, and hence a number of poor automotive bumper or the like can sharply be decreased.

The present invention is illustrated below in detail with reference to examples, but it should be construed that the invention is in no way limited to those examples.

In the following examples and comparative examples, the physical properties denoted were measured in the manner as mentioned below.

(1) Melt flow rate (MFR)

The melt flow rate was measured in accordance with ASTM D-1238 under the following conditions.

Conditions: 230° C., 2.16 kg (pellet)

(2) Flexural modulus (FM)

The flexural modulus was obtained by conducting a flex test in accordance with ASTM D-790 under the following conditions.

Specimen: 12.7 mm (width)×6.4 mm (thickness) ×127 mm (length)

Span: 100 mm

Rate of flexure: 2 mm/min.

(3) Izod impact strength (IZ)

The Izod impact strength was obtained by conducting an impact test in accordance with ASTM D-256 under the following conditions.

Temperature: −30° C.

Specimen: 12.7 mm (width)×6.4 mm (thickness) ×64 mm (length)

Mechanically notched (4) Rockwell hardness (HR)

The Rockwell hardness was obtained by conducting a hardness test in accordance with ASTM D-648 under the following conditions.

Scale: R

Specimen: Two sheets, placed one on the other, each having 120 mm (length)×130 mm (width) ×3.0 mm (thickness) were used.

(5) Heat distortion temperature (HDT)

The heat distortion temperature was obtained by conducting a test in accordance with ASTM D-648 under the following conditions.

Specimen: 12.7 mm (thickness)×6.4 mm (width) ×127 mm (length)

Test load: 4.6 kg/cm$^2$ (6) Low temperature brittle temperature (BT)

The low temperature brittle temperature was obtained by conducting a test in accordance with ASTM D-746

EXAMPLES 1–5

With a Henschel mixer, a propylene block copolymer [A], ethylene-propylene copolymer rubber [B], ethylene-propylene-diene copolymer rubber [C], ethylene-butene-1 copolymer rubber [D], and talc were mixed together for 2 minutes at room temperature.

Subsequently, the mixture thus obtained was kneaded and then pelletized with a pelletizer (NCM-60: manufactured and sold by Kobe Seikosho K.K.) at a temperature of 210° C. and 900 r.p.m. to obtain pellets of the desired propylene polymer composition.

The thus obtained propylene polymer compositions as shown in Table 1 were molded at a resin temperature of 200° C. and mold temperature of 40° C. with an injection molding machine into ASTM specimens and flat plates of 3 mm in thickness (120 mm×130 mm), followed by measurement of above-mentioned physical properties.

Results obtained are shown in Table 1.

In this connection, the physical properties of the components used in preparing the propylene polymer compositions shown in Table 1 were as in the following.

| [A] | Propylene block copolymer |
| --- | --- |
| PP-A | Content of the structural unit derived from ethylene: 4.7 mol % |
| | MFR: 50 g/10 min |
| | Soluble portion in n-decane at ordinary temperature: 7.0% by weight. |
| [B] | Ethylene-propylene copolymer rubber |
| EPR-A | Content of the structural unit derived from ethylene: 80 mol % |
| | MFR: 0.4 g/10 min. |
| EPR-B | Content of the structural unit derived from ethylene: 80 mol % |
| | MFR: 0.7 g/10 min |
| EPR-C | Content of the structural unit derived from ethylene: 60 mol % |
| | MFR: 7.1 g/10 min |
| [C] | Ethylene-propylene-diene copolymer rubber |
| EPT-A | Content of the structural unit derived from ethylene: 80 mol % |
| | Content of the structural unit derived from diene: 9 mol % |
| | Diene: 5-Ethylidene-2-norbornene |
| | MFR: 0.2 g/10 min |
| [D] | Ethylene-butene-1 copolymer rubber |
| EBR-A | Content of the structural unit derived from ethylene: 89 mol % |
| | MFR: 1–5 g/10 min |
| EBR-B | Content of the structural unit derived from ethylene: 89 mol % |
| | MFR: 6.7 g/10 min |
| EBR-C | Content of the structural unit derived from ethylene: 89 mol % |
| | MFR: 28 g/10 min |
| [E] | Talc |
| | Average particle diameter: 2.5 μm |
| | Content of particles having a particle diameter of 5 μm or larger: 3% by weight. |

Comparative Examples 1–7

The propylene polymer compositions shown in Table 1 were prepared in the same manner as in Example 1, followed by measurement of physical properties in the same manner as in Example 1.

Results obtained are shown in Table 1.

TABLE 1

| | | Example | | | | | Compar. Example | | | | | | |
| --- | --- | --- | --- | --- | --- | --- | --- | --- | --- | --- | --- | --- | --- |
| | | 1 | 2 | 3 | 4 | 5 | 1 | 2 | 3 | 4 | 5 | 6 | 7 |
| Composition | PP-A | 59 | 59 | 59 | 63 | 57 | 59 | 61 | 59 | 59 | 59 | 54 | 59 |
| | EPR-A | 7.5 | — | 7.5 | 8 | 7 | 30 | — | — | — | — | — | — |
| | EPR-B | — | 7.5 | — | — | — | — | — | 7.5 | 7.5 | — | 22 | 7.5 |
| | EPR-C | — | — | — | — | — | — | 28 | 7.5 | 7.5 | — | — | 7.5 |
| | EPT-A | 7.5 | 7.5 | 7.5 | 8 | 7 | — | — | — | — | — | — | — |
| | EBR-A | 15 | 15 | — | 16 | 14 | — | — | 15 | 15 | — | — | — |
| | EBR-B | — | — | 15 | — | — | — | — | — | — | 30 | 13 | — |
| | EBR-C | — | — | — | — | — | — | — | — | — | — | — | 15 |
| | Talc | 11 | 11 | 11 | 5 | 15 | 11 | 11 | 11 | 11 | 11 | 11 | 11 |
| MFR [g/10 min] | | 18.4 | 19.1 | 16.0 | 17.8 | 17.2 | 18.5 | 10.2 | 20.5 | 18.8 | 13.5 | 20.3 | 24.5 |
| FM [kg/cm$^2$] | | 13600 | 13500 | 13800 | 11200 | 15800 | 12600 | 13800 | 14000 | 14300 | 10500 | 13500 | 14500 |
| IZ (−30° C.) | | 6.9 | 6.2 | 7.5 | 6.5 | 6.0 | 7.3 | 12.1 | 4.7 | 4.8 | 9.2 | 4.8 | 4.2 |
| HR | | 63 | 62 | 63 | 61 | 62 | 41 | 52 | 60 | 66 | 45 | 61 | 62 |
| BT [°C.] | | −41 | −39 | −42 | −40 | −38 | −45 | −45 | −35 | −33 | −46 | −33 | −31 |
| HDT [°C.] | | 114 | 112 | 114 | 106 | 117 | 100 | 108 | 110 | 120 | 105 | 113 | 114 |

Note:
Numerical values each showing the components are parts by weight.

What is claimed is:

1. A propylene polymer composition comprising
   (A) 55–77% by weight of a propylene block copolymer based on 100% by weight of the propylene polymer composition,
   (B) 5–15% by weight of an ethylene-propylene copolymer rubber based on 100% by weight of the propylene polymer composition
   (C) 5–15% by weight of an ethylene-propylene-diene copolymer rubber based on 100% by weight of the propylene polymer composition,
   (D) 8–20% by weight of an ethylene-butene-1 copolymer rubber based on 100% by weight of the propylene polymer composition, and
   (E) 5–15% by weight of talc based on 100% by weight of the propylene polymer composition, wherein the propylene block copolymer (A) contains ethylene structural units in an amount of 4–10 mol %, has 5–15 mol % by weight of a soluble portion in n-decane at a temperature of 15°–25° C., has a melt flow rate of 15–60 g/10 min and the n-decane soluble portion has an intrinsic viscosity ($\eta$) of from 4.5–9 dl/g as measured at 135° C. in decalin, the ethylene-propylene copolymer rubber (B) contains ethylene structural units in an amount of 70–90 mol % and has a melt flow rate of 0.1–2.0 g/10 min, the ethylene-propylene-diene copolymer rubber (C) contains ethylene structural units in an amount of 70–90 mol %, and diene structural units in an amount of 8–13 mol %, and has a melt flow rate of 0.1–0.4 g/10 min, the ethylene-butene-1 copolymer rubber (D) contains ethylene structural units in an amount of 85–95 mol % and has a melt flow rate of 1.0–10.0 g/10 min, and the talc (E) has an average particle diameter of 0.2–10 µm.

2. The propylene polymer composition as claimed in claim 1 wherein a melt flow rate of the composition is 12–25 g/10 min, a flexural modulus of the composition is 10,000 kg/cm$^2$ or more, an Izod impact strength of the composition (notched) at −30° C. is 5 kg.cm/cm or more, a Rockwell hardness of the composition is 55 or more, a heat distortion temperature of the composition is 100° C. or more and a low-temperature brittle point of the composition is −30° C. or lower.

3. The propylene polymer composition of claim 1, wherein the content of the propylene block copolymer (A) is 57–70% by weight, the content of the ethylene-propylene copolymer rubber (B) is 7–12% by weight, the content of the ethylene-propylene-diene copolymer rubber (C) is 5–10% by weight, the content of the ethylene-butene-1 copolymer rubber (D) is 10–17% by weight, and the content of talc (E) is 7–12% by weight, all based on 100% by weight of the propylene polymer composition.

4. The propylene polymer composition of claim 1 wherein the talc (E) has a ratio of length or width to thickness of at least 3:1.

5. The propylene polymer composition of claim 1 wherein talc (E) is present in an amount of from 7–12% by weight based on 100% by weight of the propylene composition.

6. The propylene polymer composition of claim 1 having a melt flow rate of 15–20 g/10min, a flexural modulus of at least 11,000 kg/cm$^2$, an Izod impact strength of at least 6 kg.cm/cm, a Rockwell hardness of at least 60, a heat distortion temperature of at least 105° C. and a maximum low temperature brittle point of −35° C.

7. The propylene polymer composition of claim 1 wherein the propylene block copolymer (A) contains ethylene structural units in an amount of from 4–10 mol % and contains from 7–10% by weight of a soluble portion in n-decane at 15° to 25° C.

8. The propylene polymer composition of claim 1 wherein the ethylene propylene copolymer rubber (B) contains from 75–85 mol % of ethylene structural units.

9. The propylene polymer composition of claim 1 wherein the ethylene-propylene copolymer rubber (B) is present in an amount of from 7–12% by weight based on 100% by weight of the propylene polymer composition.

10. The propylene polymer composition of claim 1 wherein the ethylene-propylene-diene copolymer rubber (C) contains from 75–85 mol % of ethylene structural units and from 9–11 mol % of diene structural units.

11. The propylene polymer composition of claim 10 wherein the diene is 5-ethylidene-2-norbornene.

12. The propylene polymer composition of claim 1 wherein the ethylene-butene-1 copolymer rubber (D) contains from 88–92 mol % of ethylene structural units.

13. The propylene polymer composition of claim 1 wherein the ethylene-butene-1 copolymer rubber (D) is present in an amount of 10–17% by weight of the total weight of the propylene polymer composition.

* * * * *

UNITED STATES PATENT AND TRADEMARK OFFICE
CERTIFICATE OF CORRECTION

PATENT NO. : 5,567,759
DATED : October 22, 1996
INVENTOR(S) : HIROSHI TANIGUCHI, ET AL.

It is certified that error appears in the above-indentified patent and that said Letters Patent is hereby corrected as shown below:

Claim 1, column 11, line 3, delete "mol".

Signed and Sealed this

Fifteenth Day of April, 1997

Attest:

BRUCE LEHMAN

*Attesting Officer*  *Commissioner of Patents and Trademarks*